(12) United States Patent
Nakao et al.

(10) Patent No.: US 12,002,928 B2
(45) Date of Patent: Jun. 4, 2024

(54) NON-AQUEOUS ELECTROLYTE SECONDARY BATTERY

(71) Applicant: SANYO Electric Co., Ltd., Daito (JP)

(72) Inventors: Takaki Nakao, Osaka (JP); Kei Kobayashi, Osaka (JP); Atsushi Mizawa, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 780 days.

(21) Appl. No.: 17/058,365

(22) PCT Filed: May 24, 2019

(86) PCT No.: PCT/JP2019/020658
§ 371 (c)(1),
(2) Date: Nov. 24, 2020

(87) PCT Pub. No.: WO2019/235259
PCT Pub. Date: Dec. 12, 2019

(65) Prior Publication Data
US 2021/0203009 A1 Jul. 1, 2021

(30) Foreign Application Priority Data
Jun. 7, 2018 (JP) .................................. 2018-109456

(51) Int. Cl.
*H01M 10/0587* (2010.01)
*H01M 10/04* (2006.01)
(Continued)

(52) U.S. Cl.
CPC ... *H01M 10/0587* (2013.01); *H01M 10/0422* (2013.01); *H01M 10/0431* (2013.01);
(Continued)

(58) Field of Classification Search
None
See application file for complete search history.

(56) References Cited

U.S. PATENT DOCUMENTS

| | | | |
|---|---|---|---|
| 2005/0221173 A1 | 10/2005 | Tatebayashi et al. | |
| 2006/0222937 A1* | 10/2006 | Morimoto | H01M 50/528 429/130 |

(Continued)

FOREIGN PATENT DOCUMENTS

| | | |
|---|---|---|
| CN | 1677735 A | 10/2005 |
| CN | 102318127 A | 1/2012 |

(Continued)

OTHER PUBLICATIONS

International Search Report dated Jul. 9, 2019, issued in counterpart International Application No. PCT/JP2019/020658. (1 page).

(Continued)

*Primary Examiner* — Gregg Cantelmo
(74) *Attorney, Agent, or Firm* — WHDA, LLP (57) ABSTRACT

A nonaqueous electrolyte secondary battery includes a roll-type electrode group including positive and negative electrode plates and a tape attached to the outermost circumferential surface of the electrode group. The tape has two adhesion regions including an adhesive layer and a non-adhesion region that is interposed between the two adhesion regions and is composed of a base material layer only. The non-adhesion region straddles the rolling-end edge of at least one of the positive or negative electrode active material layer on the roll inner side of the positive or negative electrode collector and the positive or negative electrode active material layer on the roll outer side of the positive or negative electrode collector in the positive or negative electrode plate when the electrode group is viewed from a roll center axis toward the outside of the roll.

3 Claims, 5 Drawing Sheets

(51) Int. Cl.
    *H01M 10/0525*    (2010.01)
    *H01M 50/107*     (2021.01)
(52) U.S. Cl.
    CPC ... *H01M 10/0468* (2013.01); *H01M 10/0525* (2013.01); *H01M 50/107* (2021.01)

(56) References Cited

U.S. PATENT DOCUMENTS

2009/0130543 A1    5/2009    Tatebayashi et al.
2011/0311852 A1    12/2011   Mineya

FOREIGN PATENT DOCUMENTS

| JP | 9-161814 A    | 6/1997  |
| JP | 2005-285429 A | 10/2005 |
| JP | 2006-302801 A | 11/2006 |
| JP | 2009-199974 A | 9/2009  |

OTHER PUBLICATIONS

The Extended European Search Report dated Apr. 20, 2021, issued in counterpart EP Application No. 19815741.4. (7 pages).
English translation of Office Action dated Dec. 5, 2023, issued in counterpart CN Application No. 201980037147.9. (4 pages).

* cited by examiner

NON-AQUEOUS ELECTROLYTE SECONDARY BATTERY

TECHNICAL FIELD

The present disclosure relates to a nonaqueous electrolyte secondary battery.

BACKGROUND ART

Nonaqueous electrolyte secondary batteries including an electrode group in which a positive electrode plate and a negative electrode plate are rolled with a separator interposed therebetween and a battery case that stores the electrode group and an electrolytic solution are known in the related art. In the secondary batteries, a tape is attached to the outermost circumferential surface of the electrode group so as to fix the electrode group (refer to PTL 1 and PTL 2).

CITATION LIST

Patent Literature

PTL 1: Japanese Published Unexamined Patent Application No. 9-161814
PTL 2: Japanese Published Unexamined Patent Application No. 2009-199974

SUMMARY OF INVENTION

Technical Problem

Incidentally, in accordance with a charge-discharge cycle of the nonaqueous electrolyte secondary battery, the electrode group expands, and pressure is applied from the battery case to the electrode group. At this time, electrode plate deformation in which the electrode plates constituting the electrode group are bent may occur. When large electrode plate deformation occurs, an internal short-circuit may be caused. Regarding the nonaqueous electrolyte secondary battery, it is an important issue to sufficiently suppress electrode plate deformation that may be a cause of an internal short-circuit from occurring.

It is an object of the present disclosure to suppress electrode plate deformation that may be a cause of an internal short-circuit from occurring in a configuration in which a tape is attached to the outermost circumferential surface of an electrode group in a secondary battery.

Solution to Problem

A nonaqueous electrolyte secondary battery according to the present disclosure includes a roll-type electrode group including a positive electrode plate, in which a positive electrode active material layer is disposed on each of the roll inner surface and the roll outer surface of a band-like positive electrode collector, and a negative electrode plate, in which a negative electrode active material layer is disposed on each of the roll inner surface and the roll outer surface of a band-like negative electrode collector, that are rolled with a separator interposed therebetween and including a tape attached to the outermost circumferential surface of the electrode group so as to fix the rolling-end edge of the electrode group to the outermost circumferential surface of the electrode group, wherein the tape has two adhesion regions including a base material layer and an adhesive layer and a non-adhesion region that is interposed between the two adhesion regions and that is composed of a base material layer only, and the non-adhesion region straddles the rolling-end edge of at least one of the positive electrode active material layer on the roll inner side of the positive electrode collector, the positive electrode active material layer on the roll outer side of the positive electrode collector, the negative electrode active material layer on the roll inner side of the negative electrode collector, and the negative electrode active material layer on the roll outer side of the negative electrode collector when the electrode group is viewed from a roll center axis toward the outside of the roll.

Advantageous Effects of Invention

According to the nonaqueous electrolyte secondary battery of the present disclosure, regarding the configuration in which the tape is attached to the outermost circumferential surface of the electrode group, a non-adhesion region of the tape is arranged on a portion of the outermost circumferential surface of the electrode group in which a raised portion tends to be formed. The non-adhesion region includes no adhesive layer, thereby having a smaller thickness than the adhesion region. As a result, the thickness of part of the electrode group in the radial direction is suppressed from excessively increasing due to inclusion of the tape. Therefore, even when the electrode group is expanded during charging or discharging and a pressure is applied from an outer-side battery case, stress is suppressed from concentrating on part of the electrode group. Consequently, regarding the electrode group, electrode plate deformation that may be a cause of an internal short-circuit can be suppressed from occurring.

DESCRIPTION OF EMBODIMENTS

The embodiment according to the present invention will be described below in detail with reference to the attached drawings. In the following explanations, specific shapes, materials, numerical values, directions, and the like are exemplifications for the sake of facilitating understanding of the present invention and can be appropriately changed in accordance with the specifications of nonaqueous electrolyte secondary batteries. In this regard, the word "substantially" below is used to denote the case of completely the same and, in addition, the case assumed to be essentially the same. Further, in the case in which a plurality of embodiments and examples are included below, it is essentially intended that features of these be used in appropriate combinations.

Figure 1:
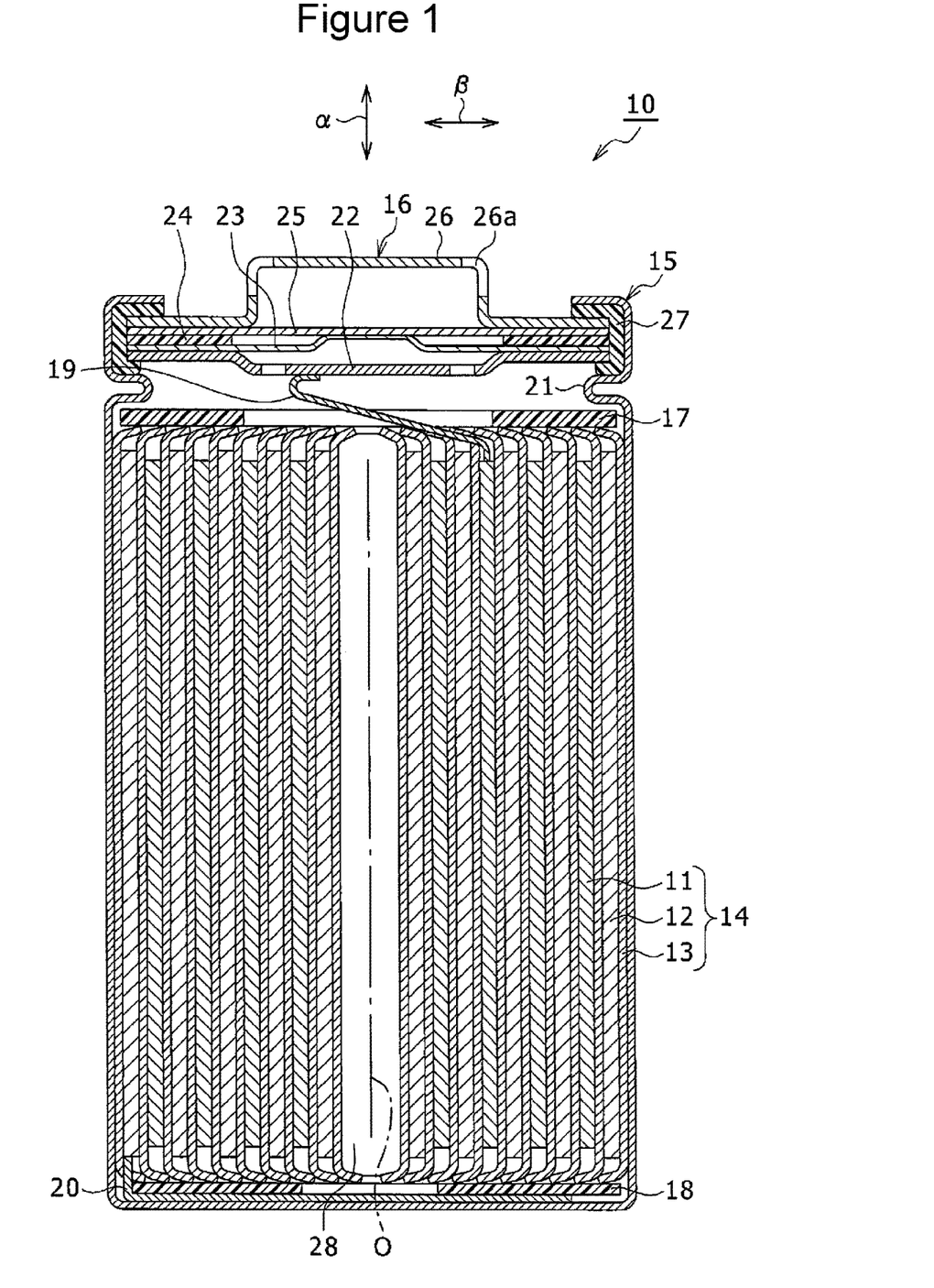
FIG. 1 is a sectional view of a nonaqueous electrolyte secondary battery that is an example of an embodiment.
Figure 2:
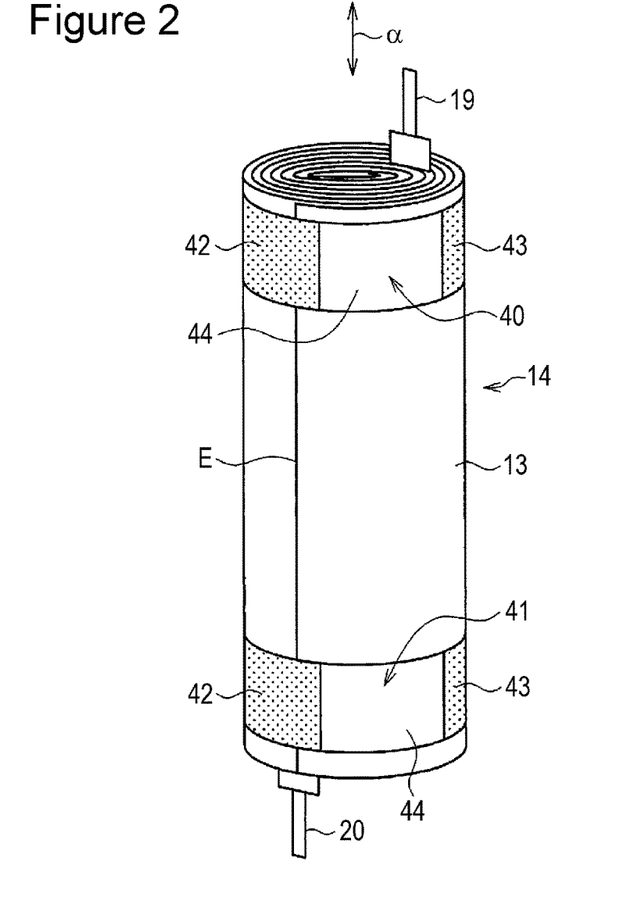
FIG. 2 is a perspective view of an electrode group constituting a nonaqueous electrolyte secondary battery that is an example of an embodiment.
Figure 3:
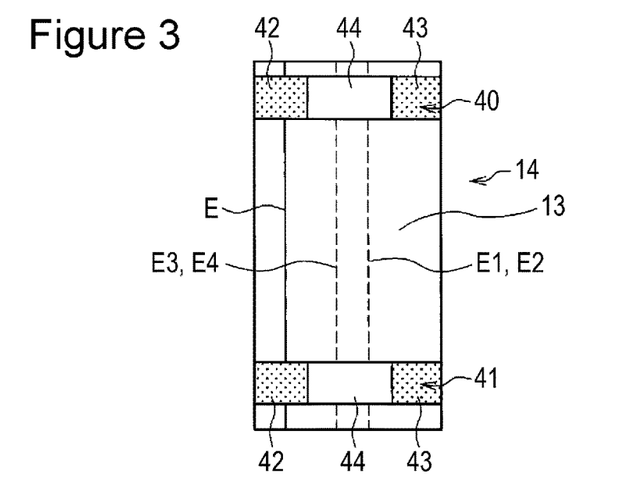
FIG. 3 is a diagram of an electrode group when viewed from the roll outer side in an example of an embodiment.
Figure 4:
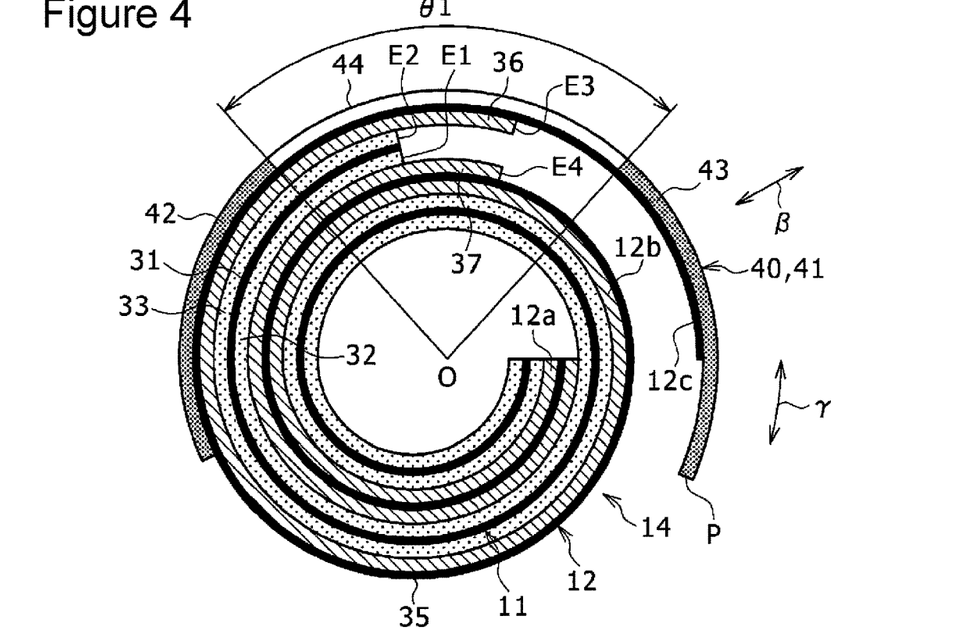
FIG. 4 is a sectional view of a roll-outer-side portion of an electrode group when viewed in the direction perpendicular to the axis direction in an example of an embodiment.
Figure 5:
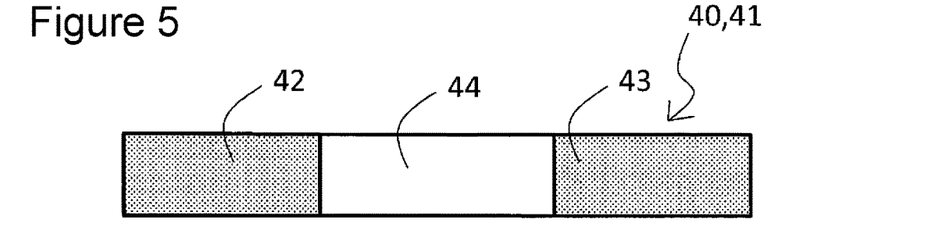
FIG. 5 is a diagram illustrating the development state of a tape constituting a nonaqueous electrolyte secondary battery in an example of an embodiment.

FIG. 1 is a sectional view of a nonaqueous electrolyte secondary battery 10 according to an embodiment. FIG. 2 is a perspective view of an electrode group 14 constituting the nonaqueous electrolyte secondary battery 10. FIG. 3 is a diagram of the electrode group 14 when viewed from the roll outer side. FIG. 4 is a sectional view of a roll-outer-side portion of the electrode group 14 (outer-circumferential-surface-side portion) when viewed in the direction perpendicular to the axis direction. FIG. 5 is a diagram illustrating the development state of a tape 40 or tape 41 constituting the nonaqueous electrolyte secondary battery 10. As illustrated in FIG. 1 to FIG. 4, the nonaqueous electrolyte secondary battery 10 includes a roll-type electrode group 14, two tapes 40 and 41 attached to the outermost circumferential surface of the electrode group 14 (FIG. 2 to FIG. 4), a nonaqueous electrolyte (not shown in the drawing), a case main body 15, and a sealing body 16. The roll-type electrode group 14 includes a positive electrode plate 11, a negative electrode plate 12, and a separator 13, and the positive electrode plate 11 and the negative electrode plate 12 are spirally rolled with the separator 13 interposed therebetween. One direction of the axis direction of the electrode group 14 may be referred to as "upward", and the other direction of the axis direction may be referred to as "downward". The nonaqueous electrolyte contains a nonaqueous solvent and an electrolyte salt dissolved in the nonaqueous solvent. The nonaqueous electrolyte is not limited to a liquid electrolyte and may be a solid electrolyte using a gel polymer or the like.

Referring to FIG. 4, the positive electrode plate 11 has a band-like positive electrode collector 31 and a positive electrode lead 19 connected to the positive electrode collector 31 (FIG. 1 and FIG. 2). The positive electrode lead 19 is a conductive member for electrically connecting the positive electrode collector 31 to a positive electrode terminal and extends from the upper end of the positive electrode collector 31 in the electrode group 14 in one direction of the axis direction α (upward). The positive electrode lead 19 is disposed at, for example, a substantially center portion of the electrode group 14 in the radial direction β. The positive electrode lead 19 is a band-like conductive member. There is no particular limitation regarding the constituent material of the positive electrode lead. Preferably, the positive electrode lead 19 is composed of a metal containing aluminum as a primary component. Further, in the positive electrode plate 11, positive electrode active material layers 32 and 33 are disposed on the roll inner surface (inner surface in the radial direction) and on the roll outer surface (outer surface in the radial direction), respectively, of the positive electrode collector 31. In FIG. 4, the positive electrode active material layers 32 and 33 are indicated by thin dotted portions.

Referring to FIG. 4, the negative electrode plate 12 has a band-like negative electrode collector 35 and a negative electrode lead 20 connected to the negative electrode collector 35 (FIG. 1 and FIG. 2). The negative electrode lead 20 is a conductive member for electrically connecting the negative electrode collector 35 to a case main body 15 described later and extends from the lower end of the negative electrode collector 35 in the electrode group 14 in the other direction of the axis direction α (downward). The case main body 15 serves as a negative electrode terminal. The negative electrode lead 20 is disposed at, for example, a roll-outer-side portion (outer circumferential surface portion) of the electrode group 14. The negative electrode lead 20 is a band-like conductive member. There is no particular limitation regarding the constituent material of the negative electrode lead. Preferably, the negative electrode lead is composed of a metal containing nickel or copper as a primary component or a metal containing both nickel and copper. Further, in the negative electrode plate 12, negative electrode active material layers 36 and 37 are disposed on the roll inner surface (inner surface in the radial direction) and on the roll outer surface (outer surface in the radial direction), respectively, of the negative electrode collector 35. In FIG. 4, the negative electrode active material layers 36 and 37 are indicated by diagonally shaded portions. As described later, the rolling-end edge E3 of the negative electrode active material layer 36 is nearer than the rolling-end edge E4 of the negative electrode active material layer 37 to the rolling-end edge of the negative electrode plate 12.

Meanwhile, the negative electrode collector 35 may be exposed at the outermost circumferential surface of the electrode group 14 and connected to the inner surface of the tubular portion of the case main body 15 so as to be electrically connected to the case main body 15. At this time, further favorable current collecting performance can be ensured by electrical connectivity between the negative electrode plate 12 and the tubular portion of the case main body 15.

As described above, the electrode group 14 has a rolled structure in which the positive electrode plate 11 and the negative electrode plate 12 are spirally rolled with the separator 13 interposed therebetween. Each of the positive electrode plate 11, the negative electrode plate 12, and the separator 13 is formed into a band-like shape and is spirally rolled so as to take on a state of being alternately stacked in the radial direction β of the electrode group 14. Regarding the electrode group 14, the longitudinal direction of each electrode plate is the rolling direction γ (FIG. 4), and the width direction of each electrode plate is the axis direction α (FIG. 2). In the present embodiment, a space 28 is formed in a roll core portion including the roll core of the electrode group 14. The electrode group 14 is spirally rolled around the roll center axis O that extends in the axis direction at the center of the space 28. In this regard, the roll center axis O is a center axis that extends in the axis direction at the center position of the space 28 in the radial direction and is a roll axis of the electrode group 14.

As shown in FIG. 2 and FIG. 3, two tapes 40 and 41 are rolling-fixing tapes that are attached to the respective end portions of the outermost circumferential surface in the axis direction α so as to fix the rolling-end edge E of the electrode group 14 to the outermost circumferential surface of the electrode group 14. Each of the tapes 40 and 41 is attached to the outermost circumferential surface of the electrode group 14 so as to cross, in the rolling direction, the rolling-end edge E of the separator 13 located as the outermost circumference of the electrode group 14 (FIG. 3). In FIG. 4, the separator 13 is omitted from the drawing.

In this regard, a non-adhesion region 44, described later, not including an adhesive layer is arranged in the middle portion of each of the tapes 40 and 41. When the electrode group 14 is viewed from the roll center axis O toward the outside of the roll (outward in the radial direction), the non-adhesion region 44 straddles the rolling-end edges E1, E2, E3, and E4 of the positive electrode active material layer 32 on the roll inner side of the positive electrode collector 31, the positive electrode active material layer 33 on the roll outer side of the positive electrode collector 31, the negative electrode active material layer 36 on the roll inner side of the negative electrode collector 35, and the negative electrode active material layer 37 on the roll outer side of the negative electrode collector 35, respectively. Consequently, regarding the electrode group 14, electrode plate deformation that may be a cause of an internal short-circuit can be suppressed from occurring. The tapes 40 and 41 will be described later in detail.

In the example illustrated in FIG. 1, the case main body 15 and the sealing body 16 constitute a metal battery case for storing the electrode group 14 and the nonaqueous electrolyte. Insulating plates 17 and 18 are disposed on the top and bottom, respectively, of the electrode group 14. The positive electrode lead 19 extends toward the sealing body 16 through a through hole of the upper insulating plate 17 and is welded to the lower surface of a filter 22 serving as the bottom plate of the sealing body 16. In the nonaqueous electrolyte secondary battery 10, a cap 26 that is the top plate of the sealing body 16 electrically connected to the filter 22 serves as a positive electrode terminal.

The case main body 15 is a metal container having an opening portion and having the shape of a tube with a bottom, for example, the shape of a circular cylinder with a bottom. A gasket 27 is disposed between the case main body 15 and the sealing body 16 so as to ensure sealing performance inside of the battery case. The case main body 15 has an overhanging portion 21 that is formed by, for example, pressing the side surface portion from the outside and that supports the sealing body 16. Preferably, the overhanging portion 21 is formed into an annular shape in the circumferential direction of the case main body 15, and the upper surface of the overhanging portion 21 supports the sealing body 16. The sealing body 16 seals the opening portion of the case main body 15.

The sealing body 16 includes the filter 22, a lower valve body 23, an insulating member 24, an upper valve body 25, and the cap 26 which are stacked successively from the electrode group 14. Each member constituting the sealing body 16 has, for example, a disc shape or a ring shape, and the members excluding the insulating member 24 are electrically connected to each other. The center portion of the lower valve body 23 and the center portion of the upper valve body 25 are connected to each other, and the insulating member 24 is interposed between the peripheral edge portions of the lower valve body 23 and the upper valve body 25. When the internal pressure of the battery is increased due to abnormal heat generation, for example, the lower valve body 23 ruptures, and the upper valve body 25 thereby bulges toward the cap 26 so as to be separated from the lower valve body 23. As a result, electrical connectivity between the lower valve body 23 and the upper valve body 25 is broken. When the internal pressure is further increased, the upper valve body 25 ruptures, and gas is discharged through an opening portion 26a of the cap 26.

The electrode group 14 and the tapes 40 and 41 will be described below in detail with reference to FIG. 2 to FIG. 5. The positive electrode plate 11 constituting the electrode group 14 includes the positive electrode collector 31 and the positive electrode active material layers 32 and 33 disposed on the positive electrode collector 31. In the present embodiment, the positive electrode active material layers 32 and 33 are disposed on the respective surfaces of the positive electrode collector 31. Regarding the positive electrode collector 31, for example, metal foil of aluminum or the like or a film provided with the metal as a surface layer is used. A favorable positive electrode collector 31 is metal foil containing aluminum or an aluminum alloy as a primary component. The thickness of the positive electrode collector 31 is, for example, 10 µm to 30 µm.

Preferably, the positive electrode active material layers 32 and 33 contain a positive electrode active material, a conductive agent, and a binder. The positive electrode plate 11 is produced by coating both surfaces of the positive electrode collector 31 with a positive electrode mix slurry containing the positive electrode active material, the conductive agent, the binder, and a solvent such as N-methyl-2-pyrrolidone (NMP) and performing drying and rolling. As illustrated in FIG. 4, the rolling-end edge E1 of the positive electrode active material layer 32 on the roll inner side of the positive electrode collector 31 and the rolling-end edge E2 of the positive electrode active material layer 33 on the roll outer side substantially aligned with each other in the rolling direction.

Examples of the positive electrode active material include lithium transition metal oxides containing transition metal elements such as Co, Mn, and Ni. There is no particular limitation regarding the lithium transition metal oxides, and complex oxides denoted by a general formula $Li_{1+x}MO_2$ (in the formula, $-0.2<x\leq0.2$ and M contains at least one of Ni, Co, Mn, and Al) are preferable.

Examples of the conductive agent include carbon materials such as carbon black (CB), acetylene black (AB), Ketjenblack, and graphite. Examples of the binder include fluororesins such as polytetrafluoroethylenes (PTFE) and polyvinylidene fluorides (PVdF), polyacrylonitriles (PAN), polyimides (PI), acrylic resins, and polyolefin-based resins. Meanwhile, these resins may be used in combination with carboxymethyl cellulose (CMC) or a salt thereof, polyethylene oxide (PEO), or the like. These may be used alone, or at least two types may be used in combination.

A plain portion (not illustrated in the drawing) at which the surface of the metal constituting the positive electrode collector 31 is exposed is disposed in the positive electrode plate 11. The plain portion is a portion to be connected to the positive electrode lead 19 and is a portion in which the surface of the positive electrode collector 31 is not covered by the positive electrode active material layer. The positive electrode lead 19 is connected to the plain portion by, for example, ultrasonic welding.

The negative electrode plate 12 includes the negative electrode collector 35 and the negative electrode active material layers 36 and 37 disposed on the negative electrode collector 35. In the present embodiment, the negative electrode active material layers 36 and 37 are disposed on the respective surfaces of the negative electrode collector 35. Further, as illustrated in FIG. 4, in the negative electrode plate 12, a rolling-start-side plain region (not illustrated in the drawing), a double-sided active material region 12a, a single-sided active material region 12b, and a rolling-end-side plain region 12c are arranged successively from where rolling starts toward where rolling ends. In the double-sided active material region 12a, the negative electrode active material layers 36 and 37 are disposed on the respective surfaces of the negative electrode collector 35. In the single-sided active material region 12b, the negative electrode active material layer 36 is disposed on the roll inner surface only of the negative electrode collector 35. In the plain region, the negative electrode active material layer is disposed on neither surface of the negative electrode collector 35. The single-sided active material region 12b extends about one revolution from the rolling-end edge of the double-sided active material region 12a to the rolling-end edge of the single-sided active material region 12b. Consequently, the rolling-end edge E3 of the negative electrode active material layer 36 on the roll inner surface of the negative electrode collector 35 is nearer than the rolling-end edge E4 of the negative electrode active material layer 37 on the roll outer surface to the rolling-end edge of the negative electrode plate 12. Further, the rolling-end edge E3 of the negative electrode active material layer 36 on the roll inner side of the negative electrode collector 35 and the rolling-end edge E4 of the negative electrode active material layer 37 on the roll outer side are substantially aligned with each other in the circumferential direction when viewed from the roll center axis O toward the outside of the roll (outward in the radial direction). In this regard, the rolling-end edge of the negative electrode active material layer 36 on the roll inner side of the negative electrode collector 35 and the rolling-end edge of the negative electrode active material layer 37 on the roll outer side may be located at positions different from each other in the circumferential direction when viewed from the roll center axis O toward the outside of the roll (outward in the radial direction). Regarding the negative electrode collector 35, for example, metal foil of copper or the like or a film provided with the metal as a surface layer is used. The thickness of the negative electrode collector 35 is, for example, 5 μm to 30 μm.

Preferably, the negative electrode active material layers 36 and 37 contain a negative electrode active material and a binder. The negative electrode plate 12 is produced by coating both surfaces of the negative electrode collector 35 with a negative electrode mix slurry containing the negative electrode active material, the binder, water, and the like and performing drying and rolling.

There is no particular limitation regarding the negative electrode active material provided that lithium ions can be reversibly occluded and released, and, for example, carbon materials such as natural graphite and artificial graphite, metals such as Si and Sn which are alloyed with lithium, and alloys, complex oxides, and the like containing these materials can be used. Regarding the binder contained in the negative electrode active material layers 36 and 37, for example, the same resins as in the case of the positive electrode plate 11 are used. In the case in which the negative electrode mix slurry is prepared from an aqueous solvent, styrene-butadiene rubber (SBR), CMC or a salt thereof, polyacrylic acid or a salt thereof, polyvinyl alcohol, and the like can be used. These may be used alone, or at least two types may be used in combination.

Regarding the separator 13 (FIG. 1 to FIG. 3), a porous sheet having ion permeability and insulation performance is used. Specific examples of the porous sheet include microporous thin films, woven fabrics, and nonwoven fabrics. Olefin resins such as polyethylenes and polypropylenes are favorable as the material for forming the separator 13. The thickness of the separator 13 is, for example, 10 μm to 50 μm. The thickness of the separator 13 tends to be reduced in accordance with increased capacity and increased output of the battery. The separator 13 has a melting temperature of, for example, about 130° C. to 180° C.

Meanwhile, as illustrated in FIG. 2 and FIG. 3, two tapes 40 and 41 are attached to the respective end portions of the outermost circumferential surface of the negative electrode plate 12 in the axis direction so as to fix the rolling-end edge E of the negative electrode plate 12 to the outermost circumferential surface of the separator 13 that is the outermost circumferential surface of the electrode group 14. The tapes 40 and 41 are formed from an insulating material, for example, a PP tape. Regarding the PP tape, an adhesive layer is disposed on one surface of a porous or nonporous polypropylene (PP) base material layer. The base material layer of each of the tapes 40 and 41 may be appropriately selected from the viewpoint of strength, resistance to an electrolytic solution, workability, cost, and the like and is not limited to polypropylene. For example, polyimide (PI), polyethylene terephthalate (PET), and polyphenylene sulfide (PPS) may be used. In addition, the base material layer may have a stacked structure. For example, a heat-resistant layer in which inorganic particles of a metal oxide or the like are dispersed in an organic material may be used as part of the base material layer. The adhesive layer of each tape is composed of a resin having adhesiveness at room temperature and is composed of, for example, an acrylic resin or a rubber-based resin.

As illustrated in FIG. 2 to FIG. 5, in each of the tapes 40 and 41, adhesion regions 42 and 43 and a non-adhesion region are arranged in stripes. Specifically, each of the tapes 40 and 41 has two adhesion regions that are rectangular regions arranged as the respective end portions in the rolling direction and the non-adhesion region 44 that is a rectangular region interposed between the two adhesion regions 42 and 43. In FIG. 2 to FIG. 5, the two adhesion regions 42 and 43 are indicated by thick dotted portions, and the non-adhesion region 44 is indicated by a plain portion. Each of the adhesion regions 42 and 43 includes a base material layer and an adhesive layer. The non-adhesion region 44 is composed of a base material layer only. In FIG. 4, the range of the non-adhesion region 44 is indicated by arrow θ1. In FIG. 4, one end portion of each of the tapes 40 and 41 in the circumferential direction (the portion represented by P) is indicated as being at a distance from the electrode group 14. However, actually, the end portion in the circumferential direction is attached to the outermost circumferential surface of the electrode group 14.

Each of the tapes 40 and 41 is attached to the rolling-end-edge portion of the electrode group 14 and to the portion of the outermost circumference surface located in the direction opposite to the rolling direction so that the middle portion in the rolling direction α crosses the rolling-end edge E of the electrode group 14. At this time, the non-adhesion region 44 is arranged as the middle portion of each of the tapes 40 and 41. The non-adhesion region 44 straddles each of the rolling-end edge E1 of the positive electrode active material layer 32 on the roll inner side of the positive electrode collector 31, the rolling-end edge E2 of the positive electrode active material layer 33 on the roll outer side of the positive electrode collector 31, the rolling-end edge E3 of the negative electrode active material layer 36 on the roll inner side of the negative electrode collector 35, and the rolling-end edge E4 of the negative electrode active material layer 37 on the roll outer side of the negative electrode collector 35 when the electrode group 14 is viewed from the roll center axis O toward the outside of the roll (outward in the radial direction).

One tape only may be attached to the middle portion of the outermost circumferential surface of the electrode group 14 in the axis direction α, or tapes may be attached to at least three positions at a distance from each other on the outermost circumferential surface of the electrode group 14 in the axis direction α.

According to the above-described nonaqueous electrolyte secondary battery 10, regarding the configuration in which the tapes 40 and 41 are attached to the outermost circumferential surface of the electrode group 14, the non-adhesion region 44 of each of the tapes 40 and 41 is arranged on the portions of the outermost circumferential surface of the electrode group 14 in which raised portions tend to be formed due to the rolling-end edges E1 to E4 of the respective active material layers. The non-adhesion region 44 includes no adhesive layer, thereby having a smaller thickness than each of the adhesion regions 42 and 43. As a result, the thickness in the radial direction of the vicinity of each of the rolling-end edges E1 to E4 of the electrode group 14 in the circumferential direction is suppressed from excessively increasing due to inclusion of any one of the tapes 40 and 41. Therefore, even when the electrode group 14 is expanded during charging or discharging and a pressure is applied from an outer-side battery case, stress is suppressed from concentrating on part of the electrode group 14. Consequently, regarding the electrode group 14, electrode plate deformation that may be a cause of an internal short-circuit can be suppressed from occurring.

In each of the tapes 40 and 41, if the ratio of the length of the non-adhesion region 44 in the circumferential direction to the circumference of the outermost circumferential surface of the electrode group 14 (length of one round) is excessively small, the effect of relaxing the stress concentration is reduced. From the viewpoint of ensuring the effect of the tape to relax the stress concentration, the ratio of the length of the non-adhesion region 44 in the circumferential direction to the circumference of the outermost circumferential surface of the electrode group 14 is preferably within the range of 5% or more and further preferably within the range of 20% or more.

The total length of the tape in the circumferential direction of the electrode group 14 is preferably more than or equal to substantially the circumference of the outermost circumferential surface of the electrode group 14 (length of one round) so that each of the adhesion region and the non-adhesion region can ensure a sufficient length. The length of the tape in the circumferential direction may be more than the circumference of the outermost circumferential surface of the electrode group 14. However, if the non-adhesion region of the tape overlaps the adhesion region, the thickness of the overlapped portion increases and, as a result, when the electrode group 14 is expanded, a pressure applied from the battery case increases so as to reduce the effect of suppressing electrode plate deformation from occurring. Consequently, it is preferable that the adhesion region of the tape does not overlap the non-adhesion region of the tape.

If the width of the tape of the electrode group 14 in the axis direction α is excessively small, the fixing power of the tape is reduced. Therefore, the tape width is preferably 10% or more the length of the electrode group 14 in the axis direction α. Meanwhile, if the width of the tape is excessively large, a pressure applied from an outer-side battery case is increased due to expansion of the electrode group 14, and the effect of suppressing electrode plate deformation from occurring. Consequently, in the case in which the secondary battery includes at least two tapes 40 and 41 as in the present example, the sum of the plurality of tape widths is preferably 20% or more and 40% or less the length of the electrode group in the axis direction α. In the configuration in which the negative electrode collector 35 is arranged as the outermost circumference of the electrode group 14, if the width of the tape is excessively large, expansion of the electrode group 14 is suppressed, and the electrode group 14 does not readily conduct to the case main body 15 through contact. From this point, the sum of the tape widths is preferably 40% or less the length of the electrode group 14 in the axis direction α. In this case, to ensure the compatibility between the fixing function of the electrode group 14 and contact of the electrode group 14 with the case main body 15, it is preferable that tapes be arranged at the respective ends of the electrode group 14 in the axis direction α. Regarding the electrode group 14, since the middle portion in the axis direction tends to expand during charging or discharging compared with both end portions in the axis direction, the tapes being arranged at respective ends of the electrode group 14 in the axis direction α increase the amount of expansion and facilitates electrical connectivity between the electrode group 14 and the case main body 15.

Figure 6:
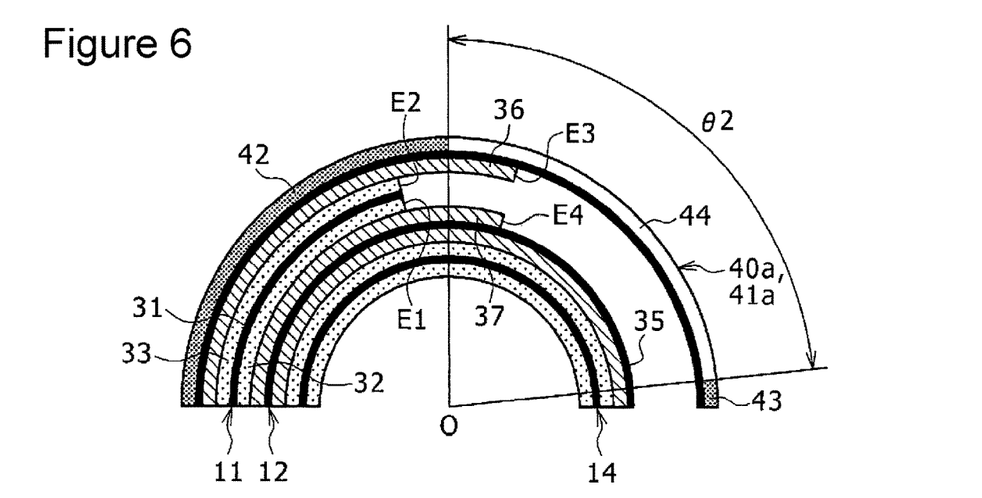
FIG. 6 is a diagram corresponding to the upper half of FIG. 4, illustrating a nonaqueous electrolyte secondary battery in another example of an embodiment.

FIG. 6 is a diagram corresponding to the upper half of FIG. 4, illustrating a nonaqueous electrolyte secondary battery in another example of the embodiment. In the configuration of the present example different from the configuration illustrated in FIG. 4, the non-adhesion region 44 of each of the tapes 40 and 41 straddles neither the rolling-end edge E1 of the positive electrode active material layer 32 on the roll inner side of the positive electrode collector 31 nor the rolling-end edge E2 of the positive electrode active material layer 33 on the roll outer side when viewed from the roll center axis O toward the outside of the roll (outward in the radial direction). Meanwhile, when the electrode group 14 is viewed from the roll center axis O toward the outside of the roll (outward in the radial direction), the non-adhesion region 44 of each of the tapes 40 and 41 straddles each of the rolling-end edge E3 of the negative electrode active material layer 36 on the roll inner side of the negative electrode collector 35 and the rolling-end edge E4 of the negative electrode active material layer 37 on the roll outer side. In FIG. 6, the non-adhesion region 44 of each of the tapes 40 and 41 is arranged in the range indicated by arrow θ2. In the present example, the other configurations and the operations are the same as the configurations in FIG. 1 to FIG. 5.

Figure 7:
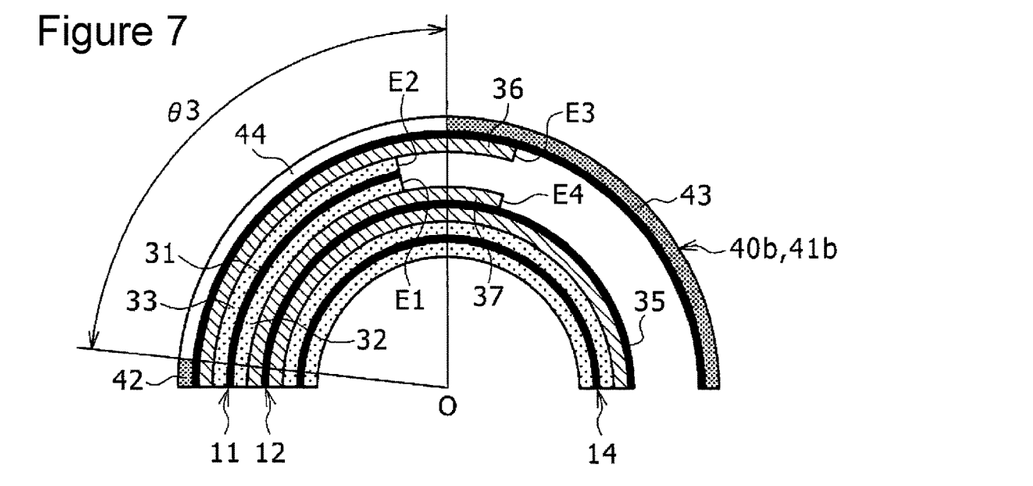
FIG. 7 is a diagram corresponding to the upper half of FIG. 4, illustrating a nonaqueous electrolyte secondary battery in another example of an embodiment.

FIG. 7 is a diagram corresponding to the upper half of FIG. 4, illustrating a nonaqueous electrolyte secondary battery in another example of the embodiment. In the configuration of the present example different from the configuration illustrated in FIG. 4, the non-adhesion region 44 of each of the tapes 40 and 41 straddles neither the rolling-end edge E3 of the negative electrode active material layer 36 on the roll inner side of the negative electrode collector 35 nor the rolling-end edge E4 of the negative electrode active material layer 37 on the roll outer side when viewed from the roll center axis O toward the outside of the roll (outward in the radial direction). Meanwhile, when the electrode group 14 is viewed from the roll center axis O toward the outside of the roll (outward in the radial direction), the non-adhesion region 44 of each of the tapes 40 and 41 straddles each of the rolling-end edge E1 of the positive electrode active material layer 32 on the roll inner side of the positive electrode collector 31 and the rolling-end edge E2 of the positive electrode active material layer 33 on the roll outer side when viewed from the roll center axis O toward the outside of the roll (outward in the radial direction). In FIG. 7, the non-adhesion region 44 of each of the tapes 40 and 41 is arranged in the range indicated by arrow θ3. In the present example, the other configurations and the operations are the same as the configurations in FIG. 1 to FIG. 5.

EXPERIMENTAL EXAMPLE

The inventors of the present disclosure produced total five types of secondary batteries of examples 1 to 3 and comparative examples 1 and 2 under the conditions described in Table 1 below and performed charging and discharging under a predetermined condition so as to examine the degree of electrode plate deformation.

TABLE 1

|  | Proportion of non-adhesion region | Non-adhesion region | | Electrode plate deformation level |
|---|---|---|---|---|
|  |  | Positive electrode active material layer rolling-end edge | Negative electrode active material layer rolling-end edge |  |
| Example 1 | 65% | straddle | straddle | A |
| Example 2 | 65% | not straddle | straddle | B |
| Example 3 | 65% | straddle | not straddle | B |
| Comparative example 1 | 0% | not straddle | not straddle | C |
| Comparative example 2 | 65% | not straddle | not straddle | C |

Example 1

[Production of Positive Electrode Plate]

A lithium-nickel-cobalt-aluminum complex oxide represented by $LiNi_{0.88}Co_{0.09}Al_{0.03}O_2$ was used as a positive electrode active material. Thereafter, 100 parts by mass of $LiNi_{0.88}Co_{0.09}Al_{0.03}O_2$, 1 part by mass of acetylene black, and 1 part by mass of polyvinylidene fluoride (PVDF) were mixed, and an appropriate amount of N-methyl-2-pyrrolidone (NMP) was further added so as to prepare a positive electrode mix slurry. Subsequently, both surfaces of an elongated aluminum foil positive electrode collector were coated with the paste-like positive electrode mix slurry, drying was performed by using a dryer, cutting into a predetermined electrode size was performed, and rolling by using a roller was performed so as to produce a positive electrode plate 11 provided with positive electrode active material layers on both surfaces of the positive electrode collector. In this regard, the crystal structure of $LiNi_{0.88}Co_{0.09}Al_{0.03}O_2$ is a layered rock salt structure (hexagonal crystal, space group R3-m). In addition, a plain portion in which an active material was not disposed was formed in the center portion of the positive electrode plate in the length direction, and an aluminum positive electrode lead was fixed to the plain portion by ultrasonic welding.

[Production of Negative Electrode Plate]

A mixture of 95 parts by mass of graphite powder and 5 parts by mass of silicon oxide was used as a negative electrode active material. Thereafter, 100 parts by mass of negative electrode active material, 1 part by mass of styrene-butadiene rubber (SBR) serving as a binder, and 1 part by mass of carboxymethyl cellulose (CMC) serving as a thickener were mixed. The resulting mixture was dispersed in water so as to prepare a negative electrode mix slurry. Both surfaces of a copper foil negative electrode collector were coated with the resulting negative electrode mix slurry, drying was performed by using a dryer, and compression was performed by using a roller of a roll-pressing machine so as to have a predetermined thickness. Subsequently, the elongated negative electrode collector provided with the negative electrode active material layer was cut into a predetermined electrode size, and a nickel negative electrode lead was attached. At this time, a plain portion in which neither of the surfaces was provided with an active material was formed at one end portion of the negative electrode collector, and a negative electrode lead was fixed to the plain portion by ultrasonic welding. At the other end portion of the negative electrode collector, a plain portion in which neither of the surfaces was provided with an active material and a single-sided active material region that was continued to the plain region and that was a single-sided coating portion provided with an active material on one surface only were formed. In this manner, the negative electrode plate 12 was produced.

[Production of Electrode Group]

A roll-type electrode group was produced by spirally rolling the resulting positive electrode plate 11 and the negative electrode plate 12 with a separator 13 interposed therebetween. At this time, the negative electrode plate 12 was rolled so that the end portion provided with the negative electrode lead was located on the rolling-start side, the end portion provided with the single-sided active material region was located on the rolling-end side, and the active-material-coated surface of the single-sided active material region was the inner surface. Regarding the separator 13, a polyethylene microporous film having one surface provided with a heat-resistant layer in which fillers composed of polyamide and alumina were dispersed was used.

[Fixing of Electrode Group]

Each of tapes 40 and 41 in which a polypropylene film having a thickness of 12 µm was coated with 7 µm of acrylic adhesive in stripes was cut. The total length of each of the tapes 40 and 41 in the circumferential direction was set to be 62 mm, where the length of the non-adhesion region 44 was set to be 40 mm and the length of each of the adhesion regions 42 and 43 on the respective sides was set to be 11 mm. Thereafter, the electrode group was fixed by attaching the tapes in the rolling direction at the respective end portions of the thus produced electrode group in the axis direction. At this time, as illustrated in FIG. 3 and FIG. 4, the non-adhesion region 44 in the middle portion of each of the tapes 40 and 41 was arranged at the position that straddles the rolling-end edges E1, E2, E3, and E4 of the positive electrode active material layer 32 on the roll inner side of the positive electrode collector 31, the positive electrode active material layer 33 on the roll outer side of the positive electrode collector 31, the negative electrode active material layer 36 on the roll inner side of the negative electrode collector 35, and the negative electrode active material layer 37 on the roll outer side of the negative electrode collector 35, respectively, when viewed from the roll center O toward the outside of the roll (outward in the radial direction).

[Adjustment of Nonaqueous Electrolyte]

Ethylene carbonate (EC), ethylmethyl carbonate (EMC), and diethyl carbonate (DEC) were mixed at a volume ratio of EC:EMC:DMC=3:3:4, and $LiPF_6$ was added to the resulting mixed solvent at a ratio of 1 mol/L so as to prepare a nonaqueous electrolytic solution.

[Production of Secondary Battery]

The electrode group was stored in a case main body 15 having the shape of a circular cylinder with a bottom and having the outer diameter of 21 mm and a height of 70 mm, insulating plates 17 and 18 were arranged on and under, respectively, the electrode group, and the nonaqueous electrolytic solution was placed inside the case main body 15. Thereafter, the opening end portion of the case main body 15 was sealed by the gasket 27 and the sealing body 16 so as to produce a circular cylinder type nonaqueous electrolyte secondary battery. At this time, the capacity of the battery was 4,600 mAh.

In this regard, in example 1, as described in the column "Proportion of non-adhesion region" of Table 1, the ratio of the length of the non-adhesion region 44 in the circumferential direction to the circumference of the outermost circumferential surface of the electrode group 14 (length of one round) was set to be 65%.

Example 2

In example 2, the non-adhesion region 44 of each of tapes 40a and 41a was arranged in the same manner as in the configuration illustrated in FIG. 6. In example 2, the other configurations were the same as the configurations in example 1.

Example 3

In example 3, the non-adhesion region 44 of each of tapes 40b and 41b was arranged in the same manner as in the configuration illustrated in FIG. 7. In example 3, the other configurations were the same as the configurations in example 1.

Comparative Example 1

Figure 8:
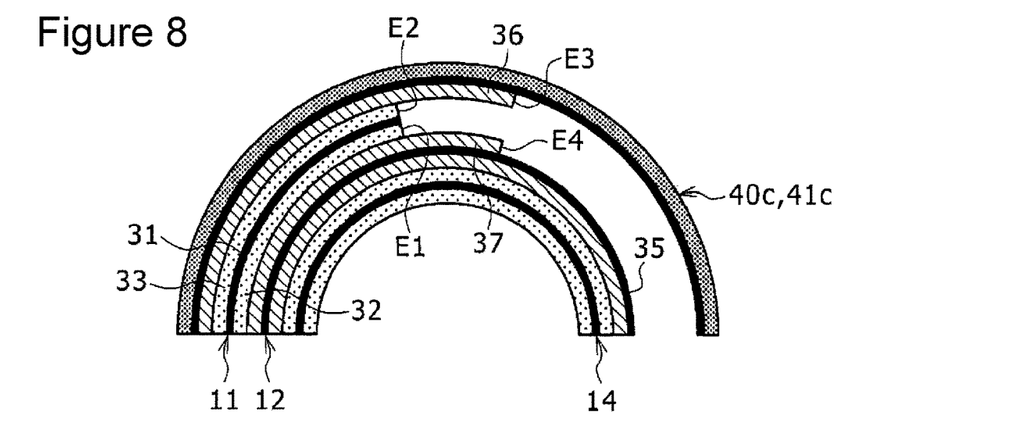
FIG. 8 is a diagram corresponding to the upper half of FIG. 4, illustrating a nonaqueous electrolyte secondary battery in comparative example 1.

FIG. 8 is a diagram corresponding to the upper half of FIG. 4, illustrating a nonaqueous electrolyte secondary battery in comparative example 1. In comparative example 1, as described in Table 1 and FIG. 8, each of tapes 40c and 41c having an adhesion region only was used. In comparative example 1, the other configurations were the same as the configurations in example 1.

Comparative Example 2

Figure 9:
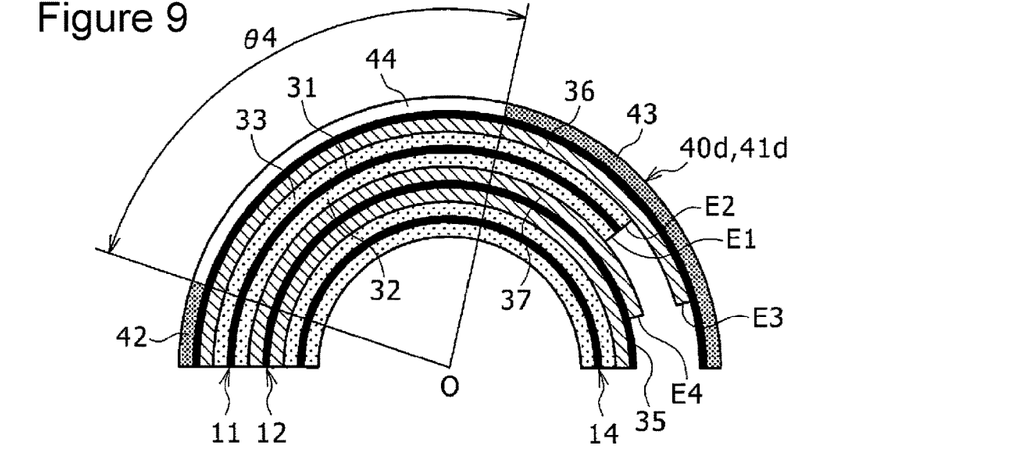
FIG. 9 is a diagram corresponding to the upper half of FIG. 4, illustrating a nonaqueous electrolyte secondary battery in comparative example 2.

FIG. 9 is a diagram corresponding to the upper half of FIG. 4, illustrating a nonaqueous electrolyte secondary battery in comparative example 2. In comparative example 2, as described in Table 1 and FIG. 9, the non-adhesion region 44 of each of tapes 40d and 41d straddled neither the rolling-end edge E1 of the positive electrode active material layer 32 on the roll inner side of the positive electrode collector 31, the rolling-end edge E2 of the positive electrode active material layer 33 on the roll outer side of the positive electrode collector 31, the rolling-end edge E3 of the negative electrode active material layer 36 on the roll inner side of the negative electrode collector 35, nor the rolling-end edge E4 of the negative electrode active material layer 37 on the roll outer side of the negative electrode collector 35 when the electrode group was viewed from the roll center axis O toward the outside of the roll (outward in the radial direction). In FIG. 9, the non-adhesion region 44 of each of the tapes 40d and 41d is arranged in the range indicated by arrow θ4. In comparative example 2, the other configurations were the same as the configurations in example 1.

[Testing Method]

The nonaqueous electrolyte secondary battery of each of examples 1 to 3 and comparative examples 1 and 2 above was used, constant-current charging (CC) was performed at a current of 1,380 mA (0.3 hour rate) in an environment of 25° C. until the battery voltage reached 4.2 V, and thereafter constant-voltage charging (CV) was performed at a battery voltage of 4.2 V until the current reached 92 mA. After a suspension of 20 minutes, constant-current discharging at a discharge current of 4,600 mA (1 hour rate) and a suspension of 20 minutes were performed. This was denoted as a charge-discharge cycle. Such a charge-discharge cycle was repeated 500 cycles. The resulting battery was subjected to constant-current charging at a current of 1,380 mA (0.3 hour rate), and after the battery voltage reached 4.2 V, constant-current charging was performed at a battery voltage of 4.2 V where the final current was set to be 92 mA. Subsequently, regarding the resulting battery, a cross section of the center portion of the electrode group was observed by using an X-ray CT apparatus. The degree of deformation of the center portion of the electrode group rated into A, B, or C is described in the column "Electrode plate deformation level" of Table 1 above.

Figure 10:
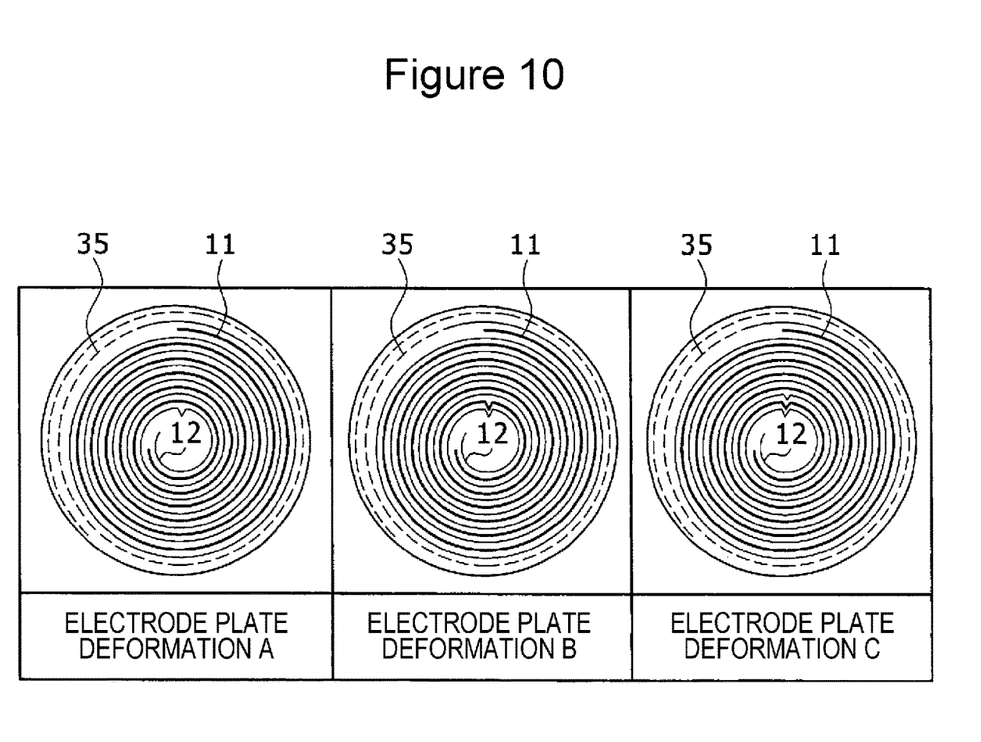
FIG. 10 is a sectional view illustrating three electrode plate deformation levels A to C used for evaluating the results of experiments to examine electrode plate deformation of an electrode group, when viewed in the direction perpendicular to the axis direction of the electrode group.

FIG. 10 is a sectional view illustrating three electrode plate deformation levels A to C used for evaluating the results of experiments to examine electrode plate deformation of an electrode group, when viewed in the direction perpendicular to the axis direction of the electrode group. The level A is the lowest degree of deformation in the three levels and indicates that deformation occurs in the innermost circumferential portion only of the electrode group. In this regard, in FIG. 10, the outermost circle expresses a battery case, and a thick curved solid line inside the outermost circle expresses a positive electrode plate 11. Meanwhile, a thin curved solid line expresses a portion including an active material layer of a negative electrode plate 12, and a thin curved broken line expresses a plain region composed of a negative electrode collector 35 only of a negative electrode plate 12.

The level B is the medium degree of deformation in the three levels and indicates that deformation occurs in two-round portions only, that is, in the innermost circumference and a circumference outside it, of the electrode group. The level C is the highest degree of deformation in the three levels and indicates that deformation occurs in at least three-round portions including the innermost circumference of the electrode group.

[Test Result]

As described in Table 1, regarding example 1, electrode plate deformation occurred in the innermost circumferential portion only of the electrode group, and the electrode plate deformation level was A. Meanwhile, the electrode plate deformation levels of examples 2 and 3 were B, and the electrode plate deformation levels of comparative examples 1 and 2 were C. Consequently, it was found that electrode plate deformation can be suppressed from occurring even in the case in which the rolling-end edge of only one of the positive electrode active material layer and the negative electrode active material layer overlaps the non-adhesion layer of the tape when viewed from the roll center axis toward the outside of the roll, as in examples 2 and 3. In addition, it was found that electrode plate deformation can be further suppressed from occurring in the case in which both the rolling-end edges of the positive electrode active material layer and the negative electrode active material layer overlap the non-adhesion layer of the tape when viewed from the roll center axis toward the outside of the roll, as in example 1. On the other hand, it was found that the degree of electrode plate deformation increases in the case in which the tape does not have a non-adhesion layer or in the case in which the non-adhesion layer of the tape straddles neither the rolling-end edge of the positive electrode active material layer nor the rolling-end edge of the negative electrode active material layer when viewed from the roll center toward the outside of the roll, as in comparative examples 1 and 2.

In this regard, it is conjectured that the effects of the above-described embodiment and examples are influenced by neither the positive electrode plate material, the negative electrode plate material, nor the separator material and that the same effects can be expected as long as the configuration includes the roll-type electrode group in which a tape is attached to the rolling-end edge.

REFERENCE SIGNS LIST

10 nonaqueous electrolyte secondary battery, 11 positive electrode plate, 12 negative electrode plate, 12a double-sided active material region, 12b single-sided active material region, 12c plain region, 13 separator, electrode group, 15 case main body, 16 sealing body, 17, 18 insulating plate, 19 positive electrode lead, 20 negative electrode lead, 21 overhanging portion, 22 filter, 23 lower valve body, 24 insulating member, 25 upper valve body, 26 cap, 27 gasket, 28 space, 31 positive electrode collector, 32, 33 positive electrode active material layer, 35 negative electrode collector, 36, 37 negative electrode active material layer, 40, 40a to 40d, 41, 41a to 41d, tape, 42, 43 adhesion region, 44 non-adhesion region

The invention claimed is:

1. A nonaqueous electrolyte secondary battery comprising:
    a roll electrode group including a positive electrode plate, in which a positive electrode active material layer is disposed on each of a roll inner surface and a roll outer surface of a band positive electrode collector, and a negative electrode plate, in which a negative electrode active material layer is disposed on each of a roll inner surface and a roll outer surface of a band negative electrode collector, that are rolled with a separator interposed therebetween; and
    a tape attached to an outermost circumferential surface of the electrode group so as to fix a rolling-end edge of the electrode group to the outermost circumferential surface of the electrode group,
    wherein the tape has two adhesion regions including a base material layer and an adhesive layer and a non-adhesion region that is interposed between the two adhesion regions and that is composed of the base material layer only, and
    wherein the non-adhesion region straddles a rolling-end edge of each of the positive electrode active material layer on a roll inner side of the positive electrode collector and the positive electrode active material layer on a roll outer side of the positive electrode collector when the electrode group is viewed from a roll center axis of the roll electrode group toward an outside of the roll electrode group, and
    the negative electrode plate includes a plain region in which the negative electrode active material layer is not disposed on either surface of the negative electrode collector in an end portion of a rolling-end side thereof.

2. The nonaqueous electrolyte secondary battery according to claim 1,
    wherein the non-adhesion region straddles the rolling-end edge of each of the positive electrode active material layer on the roll inner side of the positive electrode collector, the positive electrode active material layer on the roll outer side of the positive electrode collector, the negative electrode active material layer on the roll inner side of the negative electrode collector, and the negative electrode active material layer on the roll outer side of the negative electrode collector when the electrode group is viewed from the roll center axis toward the outside of the roll.

3. A nonaqueous electrolyte secondary battery comprising:
    a roll electrode group including a positive electrode plate, in which a positive electrode active material layer is disposed on each of a roll inner surface and a roll outer surface of a band positive electrode collector, and a negative electrode plate, in which a negative electrode active material layer is disposed on each of a roll inner surface and a roll outer surface of a band negative electrode collector, that are rolled with a separator interposed therebetween, and
    a tape attached to an outermost circumferential surface of the electrode group so as to fix a rolling-end edge of the electrode group to the outermost circumferential surface of the electrode group,
    wherein the tape has two adhesion regions including a base material layer and an adhesive layer and a non-adhesion region that is interposed between the two adhesion regions and that is composed of the base material layer only, and
    wherein the non-adhesion region straddles a rolling-end edge of each of the negative electrode active material layer on a roll inner side of the negative electrode collector and the negative electrode active material layer on a roll outer side of the negative electrode collector when the electrode group is viewed from a roll center axis of the roll electrode group toward an outside of the roll electrode group; and
    the negative electrode plate includes a plain region in which the negative electrode active material layer is not disposed on either surface of the negative electrode collector in an end portion of a rolling-end side thereof.

* * * * *